No. 804,722. PATENTED NOV. 14, 1905.
L. C. HOBART.
LUBRICATOR FOR LOOSE PULLEYS.
APPLICATION FILED AUG. 14, 1905.

Witnesses
J. H. Shummy
Grace C. Rolbes

Louis C. Hobart
Inventor
By Seymour Earle
Atty.

UNITED STATES PATENT OFFICE.

LOUIS C. HOBART, OF SOUTHINGTON, CONNECTICUT.

LUBRICATOR FOR LOOSE PULLEYS.

No. 804,722.      Specification of Letters Patent.      Patented Nov. 14, 1905.

Application filed August 14, 1905. Serial No. 274,171.

*To all whom it may concern:*

Be it known that I, LOUIS C. HOBART, a citizen of the United States, residing at Southington, in the county of Hartford and State of Connecticut, have invented a new and useful Improvement in Lubricators for Loose Pulleys; and I do hereby declare the following, when taken in connection with the accompanying drawings and the figures of reference marked thereon, to be a full, clear, and exact description of the same, and which said drawings constitute part of this specification, and represent, in—

Figure 1:
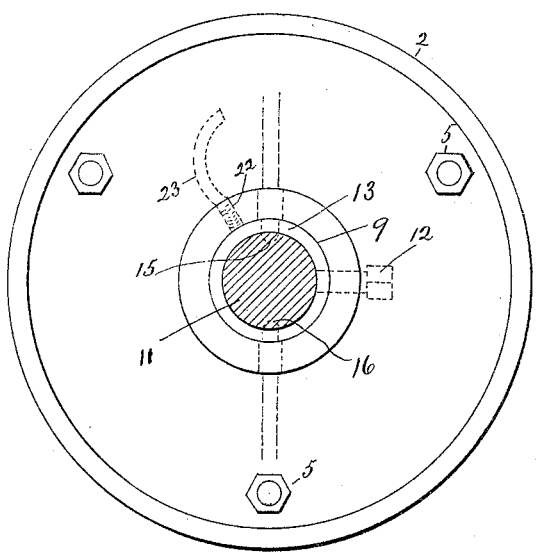
Figure 2:
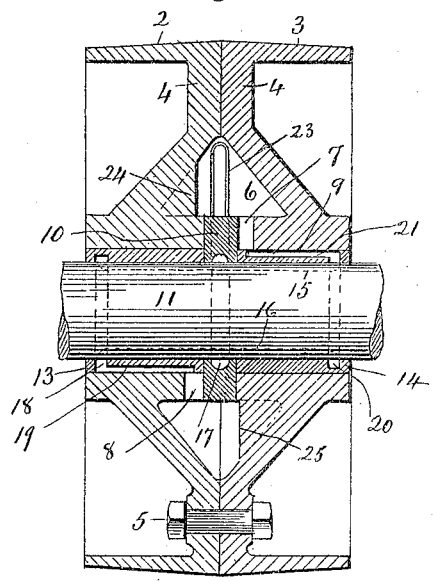
Figure 3:
Figure 4:
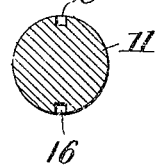

Figure 1, a side view of a pulley constructed in accordance with my invention; Fig. 2, a vertical sectional view of the same; Fig. 3, a view of a modified form of oil-conductor; Fig. 4, a sectional view through the shaft at a point over which the pulley is to be placed and representing the longitudinal grooves therein.

This invention relates to an improvement in lubricators for loose pulleys, particularly to such as comprise an oil-chamber within the pulley with passages therefrom to the bearing, the object of the invention being a simple arrangement of parts whereby the pulley may be readily constructed and applied to the shaft and which will facilitate a free circulation of lubricating material from the chamber to the surface of the shaft; and the invention consists in the construction as hereinafter described, and particularly recited in the claims.

The pulley is formed in two parts 2 and 3, secured together through their webs 4 by bolts 5. As herein shown, the parts 2 and 3 form the pulley proper, but in pulleys of larger diameter these parts form the hub of the pulley, one of the parts supporting a rim of larger diameter. By the term "pulley" as hereinafter used I therefore wish to be understood as including either a complete pulley or the hub of a pulley or wheel for any desired purpose. The adjacent faces of the parts 2 and 3 are recessed to form a chamber 6, substantially triangular in cross-section, from which ports 7 and 8 extend to a central bore 9. The walls of the base of the chamber do not meet, but provide space for a collar 10, which is fixed to a shaft 11 by a set-screw 12. The opening in the bore 9 is larger than the diameter of the shaft 11 to receive bushings 13 and 14, which extend from the outer edges of the port inward to the collar 10. Preferably, and as herein shown, the shaft 11 is formed with longitudinal grooves 15 and 16 on opposite sides, the collar 10 with an internal groove 17, the bushing 13 with an annular channel 18 opening into an external channel 19, which extends into communication with the passage 8 in the chamber 6, while the bushing 14 has an annular groove 20, intersecting an externally-arranged channel 21, which extends inward into communication with the passage 7. Extending radially through the collar 10 is a hole 22, into which is inserted a tube 23, the outer end of which is bowed. As shown in Fig. 2 of the drawings, the forward face of this tube is removed, forming an open trough, whereas in Fig. 3 it is shown as closed except at its outer end. Within the chamber 6, on opposite sides, are wings 24 and 25.

In assembling the pulley one of the parts, as 2, is first placed over the shaft. Then the collar 10 is placed on the shaft and moved to the desired position and there fixed by the set-screw 12. The other part 3 of the pulley is then placed in position and secured by the bolts 5 and the bearings packed by the bushings 13 and 14. As the pulley revolves oil carried in the chamber will enter the tube 23 and pass through the collar into the groove 17 therein, from which it flows through the channels 15 and 16, lubricating the surface of the shaft on which the bushings turn. As the oil reaches the end of the channels it enters the groove 18 or 20 and passes through the channels 19 or 21 and again enters the chamber through the holes 7 or 8. For very fast revolving pulleys the wings 24 and 25 will not be required; but if the pulleys turn very slowly the momentum would not necessarily carry the oil over, and so the wings are desirable for the purpose of giving the oil an impetus to turn it with the pulley, so that as the pulley revolves a portion of the oil at each revolution will enter the tube 23. It will thus be seen that a complete circulation of lubricating material is maintained between the chamber and the bearing, and the construction permits of the ready removal and replaceal of bushings as required and provides a system of lubrication which is free from excessive or increased friction caused by the enlarged diameter of the frictional surfaces. In addition to performing the function of preventing any relative movement between the shaft and the tube, the collar, being secured to the shaft by the set-screw and bearing against the interior faces of the hub, prevents any movement of the pulley along the axis of the shaft, thus doing away with the necessity of using a ring or collar external to the pulley, thus making the mechanism more compact.

Having fully described my invention, what I claim as new, and desire to secure by Letters Patent, is—

1. The combination with a shaft, of a pulley formed in two parts recessed at their inner faces to form a chamber, and to provide a space for a ring, a ring located between said parts and secured to said shaft, bushings surrounding the shaft and closely fitting the interior of the pulley on opposite sides of the ring, there being a passage from said chamber through said ring to the surface of the shaft, grooves and channels in the bushings, and passages from the chamber to said channels, substantially as described.

2. The combination with a shaft having longitudinal grooves, of a pulley formed in two parts, recessed at their inner faces to form a chamber to provide a space for a ring, a ring located between said parts and secured to said shaft, bushings surrounding the shaft and closely fitting the interior of the pulley on opposite sides of the ring, there being a passage from said chamber through said ring to the surface of the shaft, grooves and channels in the bushings, and passages from the chamber to said channels, substantially as described.

3. The combination with a shaft, of a pulley formed in two parts recessed at their inner faces to form a chamber, and to provide a space for a ring, a ring located between said parts and secured to said shaft, there being wings in said chamber, bushings surrounding the shaft and closely fitting the interior of the pulley on opposite sides of the ring, there being a passage from said chamber through said ring to the surface of the shaft, grooves and channels in the bushings, and passages from the chamber to said channels, substantially as described.

4. The combination with a shaft, of a pulley formed in two parts recessed at their inner faces to form a chamber and to provide space for a ring, a ring located between said parts and secured to said shaft, a curved tube inserted into and secured to said ring, bushings surrounding the shaft and closely fitting the interior of the pulley on opposite sides of the ring, there being a passage from said chamber through said ring to the surface of the shaft, grooves and channels in the bushings, and passages from the chamber to said channels, substantially as described.

In testimony whereof I have signed this specification in the presence of two subscribing witnesses.

LOUIS C. HOBART.

Witnesses:
FRED. C. EARLE,
GRACE C. DOLBEC.